US008972049B2

(12) United States Patent
Tidhar et al.

(10) Patent No.: US 8,972,049 B2
(45) Date of Patent: Mar. 3, 2015

(54) METHOD AND APPARATUS FOR DISPENSING ITEMS

(71) Applicant: Data Detection Technologies Ltd., Jerusalem (IL)

(72) Inventors: Ari Tidhar, Ganey Tikva (IL); Israel Shneiderman, Jerusalem (IL); Nachshon Kahana, Jerusalem (IL); Amichai Adam, Betar-Illit (IL); Aryeh Teitelbaum, Jerusalem (IL); Oded Davidovitch, Tel Aviv (IL); Yossi Shomer, Kochav Yaakov (IL); Yuval Lichi, Ramat Rachel (IL); Zvi Weinberger, Jerusalem (IL); Igor Faib, Jerusalem (IL)

(73) Assignee: Data Detection Technologies Ltd., Jerusalem (IL)

( * ) Notice: Subject to any disclaimer, the term of this patent is extended or adjusted under 35 U.S.C. 154(b) by 0 days.

(21) Appl. No.: 13/658,881

(22) Filed: Oct. 24, 2012

(65) Prior Publication Data

US 2013/0144431 A1    Jun. 6, 2013

(30) Foreign Application Priority Data

Dec. 1, 2011    (GB) .................................... 1120691.9

(51) Int. Cl.
*B65B 57/20*    (2006.01)
*G06F 17/00*    (2006.01)
(Continued)

(52) U.S. Cl.
CPC ................ *G06F 17/00* (2013.01); *B65B 5/103* (2013.01); *B65B 57/14* (2013.01); *B65B 57/20* (2013.01); *G06M 7/02* (2013.01); *G06M 7/04* (2013.01)
USPC .......................................... 700/240; 700/236

(58) Field of Classification Search
USPC ................................................ 700/236, 240
See application file for complete search history.

(56) References Cited

U.S. PATENT DOCUMENTS

| 2,632,588 | A | 3/1953 | Hoar |
| 4,382,527 | A | 5/1983 | Lerner |

(Continued)

FOREIGN PATENT DOCUMENTS

| DE | 20214431 | 3/2004 |
| DE | 102009052292 B3 | 4/2011 |

(Continued)

OTHER PUBLICATIONS http://www.youtube.com/watch?feature=player_embedded&v=BhHCkeLs0OU, image of video at around 17 seconds, titled "Counting machine for frozen food"; provider of video appears to be Koshinsha, according to YouTube the video was published on Mar. 2, 2012.

(Continued)

*Primary Examiner* — Timothy Waggoner
(74) *Attorney, Agent, or Firm* — Roach Brown McCarthy & Gruber, P.C.; Kevin D. McCarthy

(57) ABSTRACT

A method for rapidly and accurately dispensing a predetermined number of discrete items, the method comprising: operating a conveyor to transport multiple items towards an imaging device, wherein the items are arranged in a single layer and at least some of the items are transported in parallel; operating the imaging device to continuously capture images of an area immediately below an end of the conveyor, so that items falling off the conveyor are recorded in the images while in trajectory; processing the images in real time, to continuously determine the number of falling items; stopping the conveyor before the number of falling items has reached the predetermined number, while continuing to determine the number of falling items until items cease to fall off the conveyor innertially; and automatically dispensing an additional amount of items, to complete the predetermined number of items.

15 Claims, 7 Drawing Sheets

(51) Int. Cl.
*B65B 5/10* (2006.01)
*B65B 57/14* (2006.01)
*G06M 7/02* (2006.01)
*G06M 7/04* (2006.01)

(56) References Cited

U.S. PATENT DOCUMENTS

| | | | |
|---|---|---|---|
| 4,843,579 | A | 6/1989 | Andrews et al. |
| 5,317,645 | A | 5/1994 | Perozek et al. |
| 5,444,749 | A * | 8/1995 | Nambu ............... 700/239 |
| 5,473,703 | A | 12/1995 | Smith |
| 5,476,703 | A * | 12/1995 | Wattel et al. ............. 428/113 |
| 5,768,327 | A | 6/1998 | Pinto et al. |
| 5,884,806 | A * | 3/1999 | Boyer et al. ............ 221/75 |
| 6,253,953 | B1 | 7/2001 | Ishizuka |
| 6,449,927 | B2 | 9/2002 | Hebron et al. |
| 6,535,637 | B1 * | 3/2003 | Wootton et al. ............ 221/8 |
| 6,631,826 | B2 | 10/2003 | Pollard et al. |
| 6,659,304 | B2 | 12/2003 | Geltser et al. |
| 7,795,556 | B1 * | 9/2010 | Dean ............... 221/206 |
| 2004/0154688 | A1 | 8/2004 | Geltser et al. |
| 2005/0263537 | A1 | 12/2005 | Gerold et al. |
| 2006/0124656 | A1 * | 6/2006 | Popovich ............... 221/9 |
| 2008/0041872 | A1 * | 2/2008 | Shows et al. ............ 221/9 |
| 2008/0173649 | A1 | 7/2008 | Sus et al. |
| 2009/0177316 | A1 | 7/2009 | Schedel et al. |
| 2010/0205002 | A1 | 8/2010 | Chambers |

FOREIGN PATENT DOCUMENTS

| | | |
|---|---|---|
| EP | 1083007 | 3/2001 |
| EP | 759815 | 10/2002 |
| EP | 1852372 | 11/2007 |
| JP | 2132011 | 5/1990 |
| WO | 2011054974 A1 | 5/2011 |

OTHER PUBLICATIONS http://www.youtube.com/watch?feature=player_embedded&v=bEKsrY5SIMw, image of video at around 11 second, not titled; according to You Tube, provider of video appears to be Koshinsha, according to You Tube the video was published on Mar. 2, 2012.

http://www.youtube.com/watch?v=pKJSusmPusM&list=UUH-lhqel1SpJW4YOZeRR9mQ&index=1, image at around 2 minutes, 54 seconds, titled "Counting machine for molded parts", provider of video appears to be Koshinsha, according to You Tube the video was published on Nov. 22, 2012.

http://www.youtube.com/watch?v=Gh0siDEt4Qc&list=UUH-lhqel1SpJW4YOZeRR9mQ&index=11, image at around 30 seconds, not titled; according to You Tube, provider of video appears to be Koshinsha, according to You Tube the video was published on Feb. 3, 2012.

http://www.youtube.com/watch?v=y668e23Flf8&list=UUH-lhqel1SpJW4YOZeRR9mQ&index=20, image at around 4 seconds, not titled; according to You Tube, provider of video appears to be Koshinsha, according to You Tube the video was uploaded on Oct. 25, 2010.

http://www.youtube.com/watch?v=myECsaLgRLc&list=UUH-lhqel1SpJW4YOZeRR9mQ&index=22, image at around 7 seconds, titled "Digital Area Counter"; according to You Tube, provider of video appears to be Koshinsha, according to You Tube the video was uploaded on Sep. 3, 2010.

http://www.youtube.com/watch?v=OyEH4GL0alU&list=UUH-lhqel1SpJW4YOZeRR9mQ&Index=26, image at around 4 seconds, titled Digital Area Counter; according to You Tube, provider of video appears to be Koshinsha, according to You Tube the video was uploaded on Nov. 18, 2009.

http://www.youtube.com/watch?v=6ymjnuX4bG4&list=UUH-lhqel1SpJW4YOZeRR9mQ&index=25, image at around 17 seconds, titled Digital Area Counter; according to You Tube, provider of video appears to be Koshinsha, according to You Tube the video was uploaded on Jan. 6, 2010.

http://www.koshinsha.jp/calculation/index.html—print out of website on Mar. 6, 2013.

http://www.koshinsha.jp/calculation/digital_acounter.html—print out of website on Mar. 6, 2013.

UK Search & Examination Report regarding GB112069.9, mailed on Mar. 28, 2012—5 pages.

International Search Report for PCT/IL2011/000383, mailed on Nov. 9, 2011—3 pages.

European Search report for corresponding European application, mailed Jan. 21, 2013—six pages.

* cited by examiner

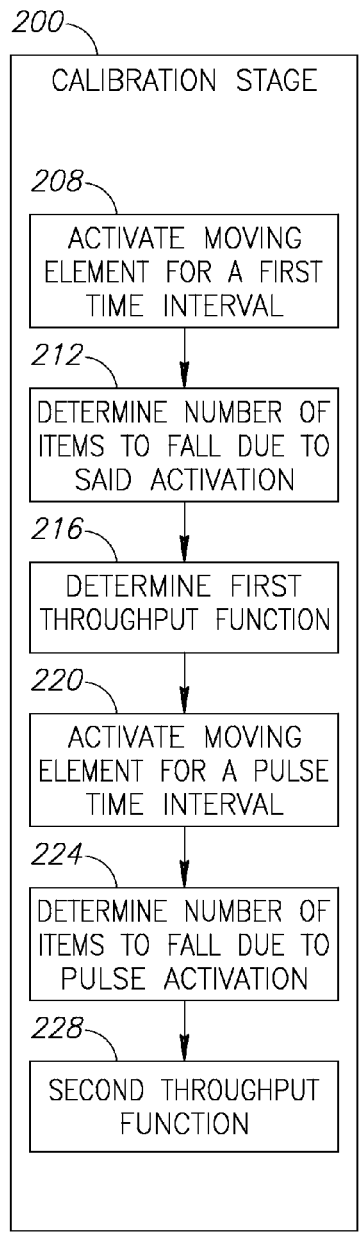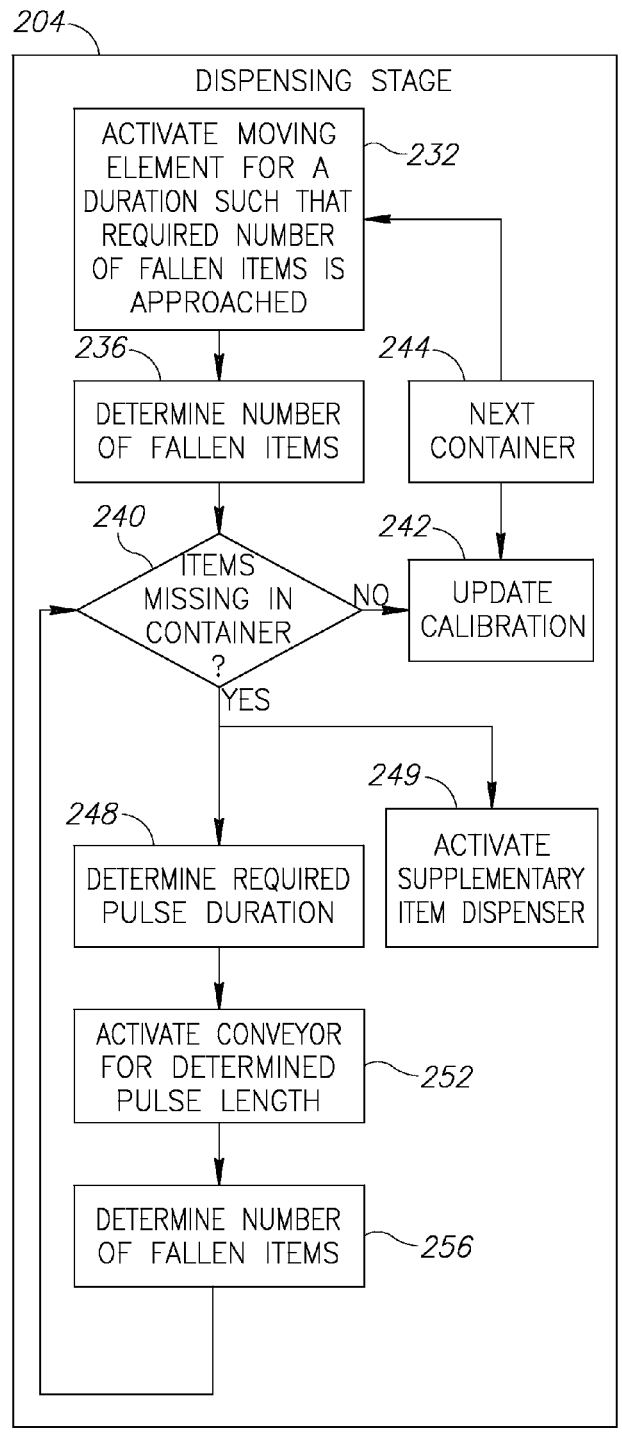
FIG.2A
FIG.2B

METHOD AND APPARATUS FOR DISPENSING ITEMS

FIELD OF THE INVENTION

The present invention relates to an apparatus and method for dispensing a multiplicity of discrete items into groups (or "batches"), each group containing a predetermined number of the items.

BACKGROUND OF THE INVENTION

It is frequently required to dispense items of particulate matter into batches of known quantity. Examples include dispensing medicinal tablets, pills, capsules, seeds, candies or the like into bottles, sacks or other containers, sorting rough diamonds into packages or containers of approximately equal number of samples, such as to enable different evaluators to estimate the quality and worth of the whole, or the like.

In some dispensing tasks, the finished container must not contain less than the predetermined number of items. For example, when dispensing certain pills, a full treatment cycle may have to be provided, therefore at least the predetermined number of items must be provided in each container.

On the other hand, the dispensed items may be expensive, so if too many of the containers contain more than the predetermined number of items, it translates to direct loss to the supplier of the items or to the packing organization.

In many dispensing machines, the items are transported along a conveyor, at the end of which they fall or are otherwise collected into containers. Thus, if the items are put onto the conveyor in a single file, then a simple counting or weighting mechanism may provide satisfactory results. However, such a mechanism is inherently slower and therefore enables the dispensing of fewer items than if the items were freely placed on the conveyor without posing such limitations.

Furthermore, some dispensing machines also utilize various barriers for physically preventing items from falling off the conveyor once the desired amount has been reached.

U.S. Pat. No. 5,473,703 to Smith, entitled "Methods and apparatus for controlling the feed rate of a discrete object sorter/counter", discloses a controller which adjusts the vibrator to oscillate the feed bowl at a predetermined amplitude until the sensor array senses a first object. The controller then adjusts the vibrator to oscillate the feed bowl at a lower amplitude and monitors the sensing of other objects. Time intervals between objects being sensed are monitored and the controller adjusts the vibrator to oscillate the feed bowl at a lower or higher amplitude to maintain a constant feed rate. A count of objects sensed is maintained and compared to a predetermined maximum count. When the count of objects equals a predetermined number less than the maximum count, the controller adjusts the vibrator to oscillate the feed bowl at a lower amplitude to lower the feed rate. When the count of objects equals the maximum count, the controller activates a gate closing the chute.

U.S. Pat. No. 6,659,304 to Geltser et al., entitled "Cassettes for systems which feed, count and dispense discrete objects", discloses a high capacity cassette for an object counting and dispensing system, that includes, inter alia, a structure which feeds the discrete objects in single file toward an exit hole.

U.S. Pat. No. 6,449,927 to Hebron et al., entitled "Integrated automated drug dispenser method and apparatus", discloses, inter alia, singulation control, which is a process by which drugs move through a canister in a nearly single-file fashion. Means for singulation control is provided by the width of the acceleration ramp and the dispensing ramp. By providing the proper ramp width, the movement of drugs in other than a nearly single-file fashion is prevented. The proper ramp width may in fact be more than one width and may, for example, be a width that is tapered from a largest width to a smallest width. It may also be preferable to design canisters for specific drugs based on the drug size and shape. The drug size and shape may be used to select a proper ramp width. Singulation control may be aided by maintaining the acceleration ramp and the dispensing ramp surfaces on which drugs move at an angle with respect to horizontal. The angle is selected so that the edge of the ramp surface closest to the center of the canister is above a horizontal plane which intersects the edge of the ramp surface farthest from the center of the canister.

Hebron further discloses that in order to minimize the fill time, the drive frequency is increased slowly until it approaches the maximum detection rate of the sensor. The drug count is a discrete integer count registered in a fixed sampling time. A moving average is used as the basis to predict when the last drug will fall through the sensor. As the drug count approaches the total count, the time to terminate the fill is predicted as a fraction of the sampling time of the counting mechanism. The vibration of the canister or unit-of-use bin by the vibrating dispenser is terminated when the estimated time to terminate is reached. In the expected event that the count is short one or two solid drugs, the drive mechanism is restarted as the last used frequency for a short time pulse, 25 milliseconds to 100 milliseconds, for example. Then the drive mechanism is turned off at least until the next drug count registers. If the count is still short, this process is repeated.

European Patent Application No. 1,852,372 to Ogawa et al., entitled "Vibrating bowl, vibrating bowl feeder, and vacuum deposition apparatus", discloses, inter alia, a vibrating bowl and the like, which are capable of accurately counting the number of objects to be fed, accurately leading objects one by one to an external place per unit time, and aligning collectivity of objects into a row or tier at an intermediate point on a feed passage by simple alignment means.

U.S. Patent Application Publication No. 2005/0263537 to Gerold et al., entitled "Automated pill-dispensing apparatus", discloses, inter alia, a bulk storage unit useful for automatically dispensing solid pills includes a track having a length, an upstream end and a downstream end, the track being adapted to feed pills along its length in a longitudinal direction when the track is vibrated. A storage unit includes a hopper positioned over the track and having an opening for dropping pills onto the upstream end, the storage unit including a door movable between an open position permitting singulated pills to drop off the downstream end and a closed position preventing pills from dropping off the track. The door, when close to the closed position and being moved to the closed position, moving parallel the longitudinal direction so that any pills handing partially off the downstream end are pushed back onto the track as the door comes to rest in the closed position.

U.S. Patent Application Publication No. 2010/0205002 to Chambers, entitled "Automated pill-dispensing apparatus", discloses, inter alia, that pills advance up a spiraling edge of a vibratory feeding bowl and pass through a singulator. Proceeding in a generally single file manner, each pill falls one by one off an exit edge of the vibratory feeding bowl into an upper portion of a pill dispensing route. As the pills pass through the upper portion, they also pass through the light beams provided by a first and second sensor pairs. Then the pills continue down through a lower portion of the dispensing route, usually a dispensing chute. After passing through the dispensing chute, the pills pass through a dispensing neck and out of the pill dispensing device and into the pill bottle. Once the desired number of pills has been dispensed, the controller signals the vibratory base unit to turn off. Moreover, a pill stop mechanism is activated by the controller to prevent any additional pills located close to the exit edge from falling into the upper portion of the dispensing route.

U.S. Pat. No. 6,253,953 to Ishizuka, entitled "Automatic high-speed pill counting apparatus", discloses, inter alia, an apparatus comprising a cylindrical pill hopper having a pill exit and a center hole in a base plate; a rotational separative feeder mounted in the cylindrical pill hopper and removably fitted on a shaft borne in the center hole of the base plate, the feeder including an upper diametrically smaller portion and a lower diametrically larger portion having an external diameter approximate to the internal diameter of the lower portion of the pill hopper, a multiplicity of vertically through holes being formed in the outer circumference of the lower diametrically larger portion and allowed to come into alignment with the pill exit for accommodating a plurality of pills vertically, the multiple vertically through holes being enlarged at their lower portions, a ring-shaped slit being formed in such a position in the outer circumference of the lower diametrically larger portion as to accommodate substantially one pill from the bottom; and a pill separating plate mounted on the cylindrical pill hopper above the pill exit and having an inwardly projected tip fitted loosely in the slit. The apparatus can count the pills quickly and accurately while preventing the inner wall of the cylindrical portion of the hopper from becoming dirty and the pills from being soiled or broken.

U.S. Pat. No. 4,382,527 to Lerner, entitled "Article handling system with dispenser", discloses, inter alia, that in a system for dispensing weighed or counted articles, articles are fed from a supply hopper by a vibratory conveyor to maintain a controlled level of articles in a bowl-shaped feeder hopper. In a weigher embodiment, articles are initially discharged from the feeder hopper through two discharge openings into an accumulator bucket. A weighing unit monitors the weight of articles in the bucket and signals a door to close one of the discharge openings as the weight of articles in the bucket begins to approach a predetermined weight. The weighing unit subsequently signals the feeder hopper drive to slow its feeding action as the weight of articles in the bucket more closely approaches the predetermined weight. The feeder hopper discharge openings are arranged near each other at locations where the door-controlled opening will provide a rapid, bulk feed of articles, while the other opening will provide a single-file trickle feed. In a counter embodiment, a feeder hopper having a single discharge opening is used so that articles can pass single file from the feeder hopper past a counter unit to an accumulator bucket.

Japanese Patent No. 2,132,011 to Kazumi et al., entitled "Granular material discharging device", discloses, in its published English abstract, improvement of the discharge control precision by selecting the vibration frequency in response to the load change or a feeder based on the measured data of the load and flow speed for each vibration frequency so that the flow speed is made constant in a medicine quantitative discharging device using a vibration feeder. The device includes a central processing unit which selects the relational data among the vibration frequency, load, and flow speed in response to the type of an inputted bulk material, e.g., D1. The optimum frequency corresponding to the present load is selected from the data D1 based on the load signal SL outputted from a weight measuring device, and the AC power source corresponding to the frequency signal is fed to an electromagnetic section via a D/A converting circuit, an integrating circuit, a V/F converting circuit, and a power driving circuit; A vibration feeder is operated at the preset frequency, and the flow speed is made nearly constant. The discharge control precision can be improved according to this constitution.

Some dispensing and packing machines include a counting mechanism for determining the actual number of collected objects. By monitoring objects interrupting the illumination of a light source onto a pixelated array, it is possible to count objects being poured.

Such a mechanism is disclosed, for example, in U.S. Pat. No. 5,768,327 to Pinto et al., entitled "Method and apparatus for optically counting discrete objects". Pinto describes an object counter including a feeding funnel having a frustroconical section, the narrow end of which is coupled to a substantially vertical feeding channel having a substantially rectangular cross section. A pair of linear optical sensor arrays are arranged along adjacent orthogonal sides of the feeding channel and a corresponding pair of collimated light sources are arranged along the opposite adjacent sides of the feeding channel such that each sensor in each array receives light the corresponding light source. Objects which are placed in the feeding funnel fall into the feeding channel and cast shadows on sensors within the arrays as they pass through the feeding channel. Outputs from each of the two linear optical arrays are processed separately, preferably according to various conservative criteria, and two object counts are thereby obtained. The higher of the two conservative counts is accepted as the accurate count and is displayed on a numeric display. In another embodiment, four sensor arrays and light sources are provided. The third and fourth sensor arrays and corresponding light sources are located downstream of the first and second arrays. The outputs of each of the sensor arrays are processed separately and the highest conservative count is accepted as the accurate count and is displayed on a numeric display.

U.S. Pat. No. 5,317,645 to Prozek et al., entitled "Method and apparatus for the recognition and counting of discrete objects", discloses, inter alia, an apparatus for counting discrete objects of various sizes and shapes as they travel through the apparatus in a disorderly flow. The apparatus includes a sensor array which comprises a plurality of photodetectors arranged in a linear fashion. The discrete objects are passed over the sensor array. By utilizing the sensor array as a means for obtaining information about the discrete objects, the apparatus samples the sensor array at predetermined time intervals, examines the various contours of the images produced through the sampling and based upon predetermined criteria determines whether an image represents one or more objects.

European Patent No. 1,083,007 to Satoru at el., entitled "Method and apparatus for sorting granular objects with at least two different threshold levels", discloses, inter alia, a method and system for sorting items in different sizes, wherein granular objects flowing in a continuous form are irradiated by light. The resulting image element signals from a solid-state image device are binarized by a threshold value of a predetermined luminance brightness determined for detecting a defective portion of a granular object of a first level, and the above image element signals are also binarized by a threshold value of a predetermined luminance brightness determined for detecting a defective portion of a second level. The second level is for a tone of color heavier than that of the first level. When a defective image element signal is detected from the binarized image elements, an image element of a defective granular object at the center location is specified and the sorting signal is outputted to act on the center location of the defective granular object corresponding to the image element at the specified center location. A granular object having a heavily colored portion which, even small in size, has influence to the product value can be effectively ejected. Sorting yield is improved by not sorting out the granular objects having a defective portion which is small and only lightly colored thus having no influence to the product value.

There is thus a need in the art for a dispensing apparatus and method, which provide for dispensing a predetermined quantity of items in each group, in an accurate, rapid and efficient manner.

SUMMARY OF THE INVENTION

There is provided, in accordance with an embodiment, a method for rapidly and accurately dispensing a predetermined number of discrete items, the method comprising: operating a conveyor to transport multiple items towards an imaging device, wherein the items are arranged in a single layer and at least some of the items are transported in parallel; operating the imaging device to continuously capture images of an area immediately below an end of the conveyor, so that items falling off the conveyor are recorded in the images while in trajectory; processing the images in real time, to continuously determine the number of falling items; stopping the conveyor before the number of falling items has reached the predetermined number, while continuing to determine the number of falling items until items cease to fall off the conveyor innertially; and automatically dispensing an additional amount of items, to complete the predetermined number of items.

In some embodiments, the automatic dispensing of the additional amount of items comprises operating a supplementary item dispenser, to dispense exactly the number of items needed for completing the predetermined number of items.

In some embodiments, the automatic dispensing of the additional amount of items comprises pulsing the conveyor, wherein the length of the pulse is determined based on an earlier calibration stage in which a ratio of pulse length to falling items is estimated statistically.

In some embodiments, the area immediately below the end of the conveyor extends to an effective portion of the width of the end of the conveyor, such that all of the items transported in parallel and falling off the end of the conveyor in parallel are recorded in the images.

In some embodiments, a vertical gap is provided between the end of the conveyor and an upper edge of the area, to ensure that an end surface of the conveyor is not recorded in the images.

In some embodiments, the processing of the images to continuously determine the number of falling items comprises increasing an item count by one when an item exits the area, wherein an exit is determined when a top portion of an item appears in an image but is missing from a consecutive image.

In some embodiments, the processing of the images to continuously determine the number of falling items comprises increasing an item count by one when an item enters the area, wherein entrance is determined when a bottom portion of an item appears in an image but is missing from an immediately preceding image.

In some embodiments, the processing of the images to continuously determine the number of falling items comprises: tracking each item over consecutive images, from entering the area until exiting the area; and increasing an item count by one upon the exit of each tracked item, to prevent a miscount if occasional noise appears in one or more of the images.

There is further provided, in accordance with an embodiment, a method counting discrete items, the method comprising: providing multiple items to be counted; operating a conveyor to transport the items towards an imaging device, wherein the items are arranged in a single layer and at least some of the items are transported in parallel; operating the imaging device to continuously capture images of an area immediately below an end of the conveyor, so that items falling off the conveyor are recorded in the images while in trajectory; processing the images in real time, to continuously determine the number of falling items; and providing a total determined number of falling items once the processing indicates that no items have fallen for a predetermined period of time.

In some embodiments, the method further comprising automatically stopping the conveyor once the processing indicates that no items have fallen for a predetermined period of time.

There is further provided, in accordance with an embodiment, an apparatus for rapidly and accurately dispensing a predetermined number of discrete items, the apparatus comprising: a parallel transport conveyor configured to transport multiple items, in parallel, from a hopper to an end of the conveyor; an imaging device configured to continuously capture images of an area immediately below an end of the conveyor, so that items falling off the conveyor are recorded in the images while in trajectory; a counting device configured to process the images in real time, to continuously determine the number of falling items; an actuator configured to control operation of said conveyor in accordance with actuator control commands; a computing platform configured to receive the number of falling items from said counting device, to generate the actuator control command to stop said conveyor before the number of falling items has reached the predetermined number, and to generate a dispenser control command based on the number of items needed for completing the predetermined number of items; and a supplementary item dispenser configured, responsive to the dispenser control command, to dispense exactly the number of items needed for completing the predetermined number of items.

In some embodiments, said counting device comprises an image sensor and is configured to capture said images using a predetermined number of pixel rows of said image sensor, the predetermined number being lower than a total number of sensor rows existing in said image sensor.

In some embodiments, said counting device is configured to determine the number of falling items by analyzing a pattern of sensor pixels affected by a falling item in consecutive samples of the image sensor.

In some embodiments, said counting device comprises an image sensor, and wherein the apparatus further comprises at least one light source for providing light to be reflected by the falling items onto the image sensor.

In some embodiments, the apparatus further comprising a lens assembly for focusing light reflected from the falling items onto the imaging device.

There is further provided, in accordance with an embodiment, an item dispenser comprising: a parallel transport conveyor configured to transport items at a rate of at least 50 items per second; an imaging device configured to continuously capture images of an area below an end of the conveyor, so that items falling off the conveyor are recorded in the images while in trajectory; a counting device configured to process the images in real time, to continuously determine the number of falling items; an actuator configured to control operation of said conveyor in accordance with actuator control commands; a computing platform configured to receive the number of falling items from said counting device, to generate the actuator control command to stop said conveyor before the number of falling items has reached the predetermined number, and to generate a dispenser control command based on the number of items needed for completing the predetermined number of items; and a supplementary item dispenser configured, responsive to the dispenser control command, to dispense exactly the number of items needed for completing the predetermined number of items, at a rate of 1-4 items per second.

There is further provided, in accordance with an embodiment, an item dispenser comprising: a parallel transport conveyor; an imaging device for capturing at least one image of items as they fall off the conveyor, wherein most of the items are positioned on substantially a same plane when captured by the imaging device; a counting device for counting the items based on the at least one image; and a computing platform connected to said conveyor and to said counting device, and being configured to operate said conveyor in a continuous mode until a desired item count of a present batch is indicated by said counting device as nearly being reached, and in a pulsed mode to complete at least an amount of items missing from the desired item count, wherein the pulsed mode comprises activation of said conveyor in at least one pulse having a length which was pre-determined to cause a set number of items to fall off the conveyor as a direct result of the conveyor's operation as well as indirectly, due to inertial forces following the pulse.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 2A is a flowchart of steps in a method for calibrating a dispensing machine;

FIG. 2B is a flowchart of steps in a method for operating a dispensing machine;

DETAILED DESCRIPTION

Figure 1A:
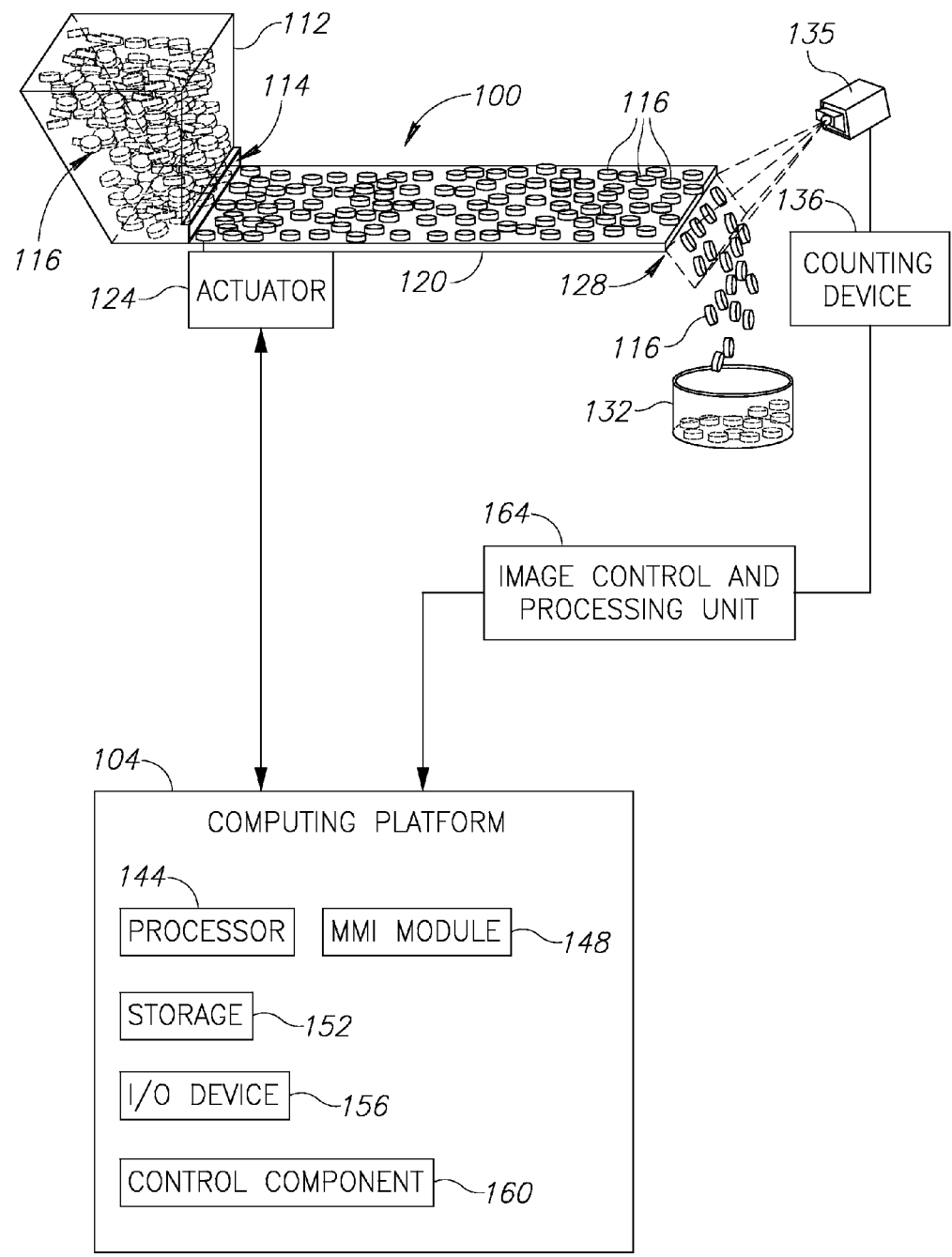
FIG. 1A shows a schematic illustration of a first exemplary embodiment of a machine for dispensing items.

The following description relates to rapid, accurate and efficient dispensing of predetermined quantities of discrete items, such as seeds, gems, medicinal tablets, pills, capsules, candies or the like.

One technical problem addressed by the disclosed method and apparatus relates to a situation in which it is required to dispense substantially identical items from a container into separate packages, each package containing the same predetermined number of items. The dispensing has to be done at high accuracy, such that no package contains less than the predetermined number of elements so as to avoid customer dissatisfaction and complaints. On the other hand, packages containing more than the predetermined number should be rare, in order to avoid waste and financial losses.

One technical solution is the provisioning of an apparatus and method for dispensing a predetermined number of items.

The apparatus may include a feeder such as a hopper or a silo which can contain a large amount of the items which are to be dispensed. The hopper releases the items onto a conveyor activated by an actuator, the actuator controlled by a computing platform. The conveyor may be a conveyor belt, a vibrating conveyor, a vibrating chute, a chute having changing inclination, or any similar means for transporting items along a path. In some embodiments, the items are released from the hopper in a free manner, such that multiple items can be released simultaneously or with minimal time difference, so that a second item begins to release before a first item has been fully released. As a result of the motion of the conveyor and/or its vibrations, the items become randomly arranged on the surface of the conveyor, in a single layer, and in a way that multiple items run in parallel (as opposed to a single file).

The vibrations of the actuator may make the items vibrate on the conveyor, so that each of them eventually assumes a stable posture. For example, some items, such as medicinal tablets, may be shaped as right circular cylinders, or a similar shape having at least one substantially planar face. The vibrations may cause the tablets to move such that any one of their planar sides is placed on the conveyor, wherein usually tablets do not lean on each other, but rather a full planar face of each tablet is placed on the conveyor's surface. Items that do not have a planar side may assume a relatively stable posture according to their shape, center of gravity and the like. For example, tubular capsules with rounded ends may lie with the tubular surface, as opposed to the head, on the conveyor. Being symmetrical, even if a capsule rotates about its tubular surface, it will have the same projection when viewed from above.

As items reach the end of the conveyor, they start falling in ballistic trajectory off the conveyor, into a container or a track which eventually leads to a container. As the items start falling off of the conveyor, the gaps between them tend to increase, and items that were previously touching each other while on the conveyor tend to separate. Accordingly, in an embodiment, an imaging device continuously captures images of an area immediately below the end of the conveyor ("counting area"), so that the falling items are depicted in the images while in trajectory, when the vast majority of items, if not all of them, are spread out and not in contact with one another. This enables better counting of the items during computerized analysis of the captured images.

In an alternative embodiment, the conveyor, which is generally horizontal, ends with a sloped sliding area. The items fall off the conveyor to the sliding area, slide across the area and at its end fall into the container being filled or into a track which leads to the container. The slope of the sliding area provides for substantially the same speed function of the items travelling along the sliding area, and thus for substantially the same falling speed of the items at the instance they leave the sliding area. It also provides for increased spacing between items, and for a substantially similar trajectory once leaving the sliding area, therefore providing a similar angle in relation to the imaging device.

In some embodiments, excluding incidental acceleration of the conveyor when started and deceleration when stopped, the actuator moves the conveyor at constant characteristics, such as speed, vibration frequency, vibration amplitude, chute inclination, and/or the like.

The items are being counted as they fall off the conveyor edge or off the sliding area, and once at least a predetermined number of items have fallen into the container, the conveyor is stopped. In some embodiments, the predetermined number is an undershoot, i.e., smaller than the quantity of items required to be finally dispensed, since it is taken into account that after the conveyor has stopped, one or more items may still fall through the counting area into the container by virtue of inertial forces. The item(s) falling after the conveyor has stopped are counted as well, and the total number of items in the container is determined.

In an embodiment, the system may be configured such that even with the inertial fall, the total number of dispensed items is in almost all cases still smaller than the final required number. In these cases, the control system re-activates the conveyor in one or more pulses, as necessary, so that additional items fall off and complete the final number.

A pulse relates to a short activation, in which the conveyor operates at its steady speed (or other characteristic) for a short time period. Some pulses may be even so short, that the conveyor does not even manage to reach its previous, steady speed. Typically, a pulse may last a fraction of a second, and causes a few items, such as, for example, 1-10 items, to fall off the conveyor or the sliding area.

The accumulated number of dispensed items is determined after each pulse, so as to determine whether additional pulses are required. Once the number of dispensed items has been reached (or exceeded) the number of required items, the container is removed, and a new container is placed and filled in the same manner.

As an alternative to the pulse, an additional device, referred to as a supplementary item dispenser, may be used to complete the items still missing from the final number. The supplementary item dispenser may include a mechanism that holds multiple items in storage and mechanically pushes them out discretely, one by one. This mechanism may be relatively slow, especially when the number of missing items is, for example, 5 or more. This slowness may, theoretically, render the entire process inefficient, since the very fast dispensing by the conveyor seems useless if a slow additional step is needed every time. By way of example, the conveyor may dispense at a rate of at least approximately 50 items per second (or, in another embodiment, at least approximately 90 items per second), while the supplementary item dispenser will only be able to dispense 1-4 items per second—as experimentally verified by the inventors.

Therefore, in an embodiment, the dispensing by the conveyor and the dispensing by the supplementary item dispenser may be performed at least partially simultaneously, thereby mitigating or eliminating the slowness problem. In this embodiment, two container stations are provided: a first station below the end of the conveyor, for receiving the falling items, and a second station at the supplementary item dispenser, for receiving the discretely-dispensed items. This way, while the supplementary item dispenser completes the missing items in a container already filled by the conveyor, other items are being dispensed into a second container at the first station, by the conveyor. When the second container is filled with the undershoot amount of items, it moves to the second station for completion, and so on and so forth.

As long as the time to fill at the second station does not exceed the time to fill at the first station, the supplementary item dispenser will not cause any delays. If the time at the second station is somewhat longer than at the first station, the whole process may still be regarded as beneficial, since the majority of the time at the second station is, still, not a waste.

The method and apparatus may require calibration for each type of dispensing task. The calibration may depend on the characteristics of the dispensed items, for example size, shape, weight, friction coefficient against the conveyor or against the sliding area, and/or the like. The calibration also depends on the operation parameters of the apparatus, such as minimal or maximal speed, acceleration and deceleration speed, physical dimensions and/or the like.

Calibration comprises determining one or more parameters related to the activation of the apparatus, such as the rate at which the items are dispensed from the hopper onto the conveyor, the initial length of time for which the control system activates the conveyor so as to dispense most of the required quantity, and the duration of pulse required to complete dispensing of the predetermined quantity.

If a sliding area is used, the length or slope of the sliding area may be determined as well.

In some embodiments, the length of the pulse may depend on the number of items still missing in a container. For example, if one or two items are missing, the apparatus may be calibrated to activate the conveyor for one 100 millisecond pulse. However, if 20 items are missing, the pulse length may be determined to be 500 milliseconds, after which a few items may still be missing, thus requiring another pulse. Naturally, these exemplary values may change depending on the type of dispensed items and/or the operation parameters of the apparatus.

In some embodiments, in which the conveyor may assume different characteristics for each dispensing type (such as speed, slope if relevant, vibration rate, vibration amplitude, and/or the like), these characteristics may also be determined during the calibration stage.

In addition to a calibration step which is performed prior to a new type of dispensing task, calibration may also be performed on the fly, while a dispensing task is being executed. After a group of items has finished to dispense, the operating parameters which characterized this group may be used to adjust the parameters for the next group. For example, if the initial calibration had determined that the conveyor should stop 5 items before the final count is reached, but during the task it appears that an overshoot of the final count occurs too often, then the later, on the fly calibration may set the apparatus to stop the conveyor 6 items before the final count. Similarly, other parameters may be adjusted should any deviation from the desired result is detected at some point. This way, especially during long dispensing tasks having a large number of groups to dispense, there is constant control over the dispensing, such that any deviation from the initial calibration is prevented or at least mitigated.

The counting device employed for determining the number of items that have fallen into the container may be implemented in a variety of ways. In some exemplary embodiments, a method and an arrangement may use an image sensor comprised of rows and columns of pixels.

The sensor may be located such that the sensor rows are oriented substantially horizontally, and the sensor columns are inclined at a certain angle in relation to the trajectory of the items at the counting area, for example perpendicular to the trajectory, between 45° and 90°, or between 90° and 135°. The sensor may be positioned either above the trajectory of falling items or below the trajectory, namely—below the conveyor (or the sliding area, if it exists).

The sensor may be controlled by a control and processing unit associated with a computing platform. The sensor may be a complementary metal-oxide-semiconductor (CMOS) sensor, a charge-coupled device (CCD) sensor or any other sensor. In usual embodiments, a lens is located between the sensor and the falling area of the items, and one or more optional light sources such as white Light Emitting Diodes (LEDs) may shed light on the falling items. The LEDs may illuminate the falling area at an angle such that only minimal light is reflected from objects other than the falling items, and the lens focuses the light reflected from the falling items onto the sensor. Alternatively, the LEDs may be positioned below the trajectory, such that the sensor picks up the shadows of the falling items.

Optionally, only a predetermined group of sensor rows, out of the total rows of the sensor, is sampled, for example 1-20 rows, such that collecting the values of the sensor rows may be described as imaging the falling items through a relatively narrow planar slit. In an alternative embodiment, the whole sensor may comprise only a small number of pixel rows, for example 1-20 rows.

Since the falling speed of the items is substantially uniform due to the conveyor speed or the sliding area, the sampling rate of the sensor may be set such that light reflected from an item falling at an average speed will be captured by at least a predetermined number of consecutive sensor samples. The number of pixels affected by the item on the sensor may depend on the shape of the falling item. For example, a tablet shaped as a right circular cylinder is likely to fall such that its planar faces appear substantially as a circle. Thus, the sensor rows in which the item is seen may produce a pattern in which the first and last sensor samples in which the item is captured may contain less affected pixels than intermediate samples.

Due to the known pattern of pixels in the sensor samples affected by each tablet when it falls, and since usually items fall separately since they do not lean on each other, two or more adjacent falling items which are captured by a single sensor samples can be distinguished using previous or consecutively captured samples.

One technical effect of the disclosed subject matter is providing a method and apparatus for dispensing a predetermined number of items into a container, with high accuracy so that in almost 100% of the cases, the package contains exactly the required number, and the task is performed at a high efficiency so that the available resources are utilized well.

Reference is now made to FIG. 1A, which shows a schematic illustration of an apparatus for providing for dispensing a predetermined number of items at high accuracy and high efficiency.

The apparatus comprises a machine 100 communicating with and receiving control commands from a computing platform 104. Machine 100 comprises an imaging (or "capturing") device 135 and a counting device 136 which provides information to control and processing unit 144. Computing platform 104 provides control commands to machine 100.

Machine 100 comprises a reservoir, such as a hopper or silo 112, which contains a multiplicity of items 116 to be dispensed into containers. Each container, such as container 132, is to contain, finally, a predetermined number of items 116.

Hopper 112, shown here as one example of a reservoir, may comprise a gate at its lower opening 114. Raising or lowering the gate limits the number of items 116 being dispensed from hopper 112 onto conveyor 120. In some embodiments, lower opening 114 is wide enough to allow multiple items 116 to be dispensed onto conveyor 120 in parallel. Handling multiple items concurrently provides for fast dispensing and high yield of the method and apparatus. However, those of skill in the art will recognize that items may be dispensed onto conveyor 120 using other means known in the art.

Conveyor 120 may be a conveyor belt, a vibrating chute, a chute having variable inclination angle or the like. Optionally, conveyor 120 is of a form (hereinafter "parallel transport conveyor") which enables transporting multiple items at least partially in parallel, in a direction orthogonal to the transport direction. Conveyor 120 is of such a width that multiple items fit on its top surface in parallel.

Conveyor 120 is controlled by actuator 124, which receives commands from computing platform 104. Actuator 124 may operate by electrical current, hydraulic fluid pressure, pneumatic pressure or any other energy source, and converts the energy into some kind of motion applied to conveyor 120.

The functionality of actuator 124 depends on the nature of conveyor 120. For example, if conveyor 120 is a conveyor belt, then actuator 124 drives or stops the belt; if conveyor 120 is a vibratory chute then actuator 124 starts or stops a vibration engine; if conveyor 120 is a variable inclination chute then actuator 124 lowers or raises one side of the chute, or the like.

In some embodiments, actuator 124 causes vibrations in conveyor 120, which cause the items on conveyor 120 to assume a certain position. For example, if the dispensed items are cylinder-shaped medicinal tablets, the vibrations may cause them to assume a position on conveyor 120 such that one of their planar sides rests on conveyor 120, and generally no item leans partially or fully on another item. However, the items may occasionally touch each other.

Items 116 proceed along or with conveyor 120 when operated, until the conveyor's end 128.

From conveyor end 128, the items fall and reach container 132, either directly, as shown, or through a track (not shown) that leads to the container.

In some embodiments, the speed of actuation of conveyor 120 and therefore the speed of the items placed thereon, can be for example between about 2 cm per second and 20 cm per second, e.g., 6 cm per second.

The falling items are imaged by capture device 135 as they travel along a virtual "counting area" 129 extending from conveyor end 128 or slightly below it to a certain distance below, forming a virtual convex rectangle which faces the capture device. The images may then be analyzed by counting device 136. Counting device 136 may receive control commands, such as a command to sample a sensor within capture device 135, from control and processing unit 164. Control and processing unit 164 may be a part of, or otherwise associated with computing platform 104 detailed below. Counting device 136 may provide the imaged data to control and processing unit 164 for counting. Control and processing unit 164 may transfer the raw data or the counting results or intermediate results to computing platform 104.

In some embodiments, control and processing unit 164 may be implemented as part of computing platform 104, for example as an application executed by computing platform 104. However, in other embodiments, control and processing unit 164 may be implemented separately from computing platform 104, or as a part of counting device 136.

Counting device 136 and the operation of control and processing unit 164 is further detailed in association with FIG. 3 and FIGS. 4A-4C below.

Computing platform 104 may comprises a processor 144. Processor 144 may be any Central Processing Unit (CPU), a microprocessor, an electronic circuit, an Integrated Circuit (IC) or the like. Alternatively, computing platform can be implemented as hardware or configurable hardware such as field programmable gate array (FPGA) or application specific integrated circuit (ASIC). In yet other alternatives, processor 144 can be implemented as firmware written for or ported to a specific processor such as digital signal processor (DSP) or microcontrollers. Processor 144 may be used for performing mathematical, logical or any other instructions required by computing platform 104 or any of it subcomponents.

In some embodiments, computing platform 104 may comprise an MMI (man-machine interface) module 148. MMI module 148 may be utilized for receiving input or providing output to and from machine 100, counting device 140, or a user, for example receiving specific user commands or parameters related to calibrating and operating the apparatus, storing and retrieving information, providing output for analyzing performance of the apparatus, or the like.

In some exemplary embodiments, computing platform 104 may comprise one or more storage devices such as storage device 152. Storage device 152 may be non-transitory (non-volatile) or transitory (volatile). For example, storage device 152 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 152 may retain program code of control component 160 detailed below operative to cause processor 144 to perform acts associated with any of the steps of FIG. 2 detailed below, displaying information to the user, or the like. Storage device 152 may also retain information such as calibration results to be used when operating the machine for a particular type of dispensing task, number of finished containers, the number of items in each container, or the like.

Computing platform 144 may further comprise or be associated with one or more Input/Output (I/O) devices 156 communicating with MMI module 148, such as a terminal, a display, a keyboard, an input device or the like, to interact with the system, to provide instructions for calibrating the machine or the like.

Computing platform 144 may also execute control component 160 for determining and generating control commands to be provided to actuator 124, optionally during calibration, and optionally during operation, for example in accordance with counts received from counting device 136.

Control component 160 can be implemented as one or more sets of interrelated computer program instructions, which may be developed using any programming language and under any development environment. The computer program instructions may be stored on storage 152 and provided to processor 144 or any other programmable processing apparatus to produce a machine, such that the instructions, which execute via the processor, create means for implementing the functions specified in the flowcharts or block diagrams.

The computer program instructions may also be stored on a computer-readable non-transitory medium to produce an article of manufacture. The steps performed by control component 160 are further detailed in association with FIG. 2 below.

It will be appreciated that computing platform 144 can be provided remotely from machine 100, as part of machine 100, or in any combination thereof.

Figure 1B:
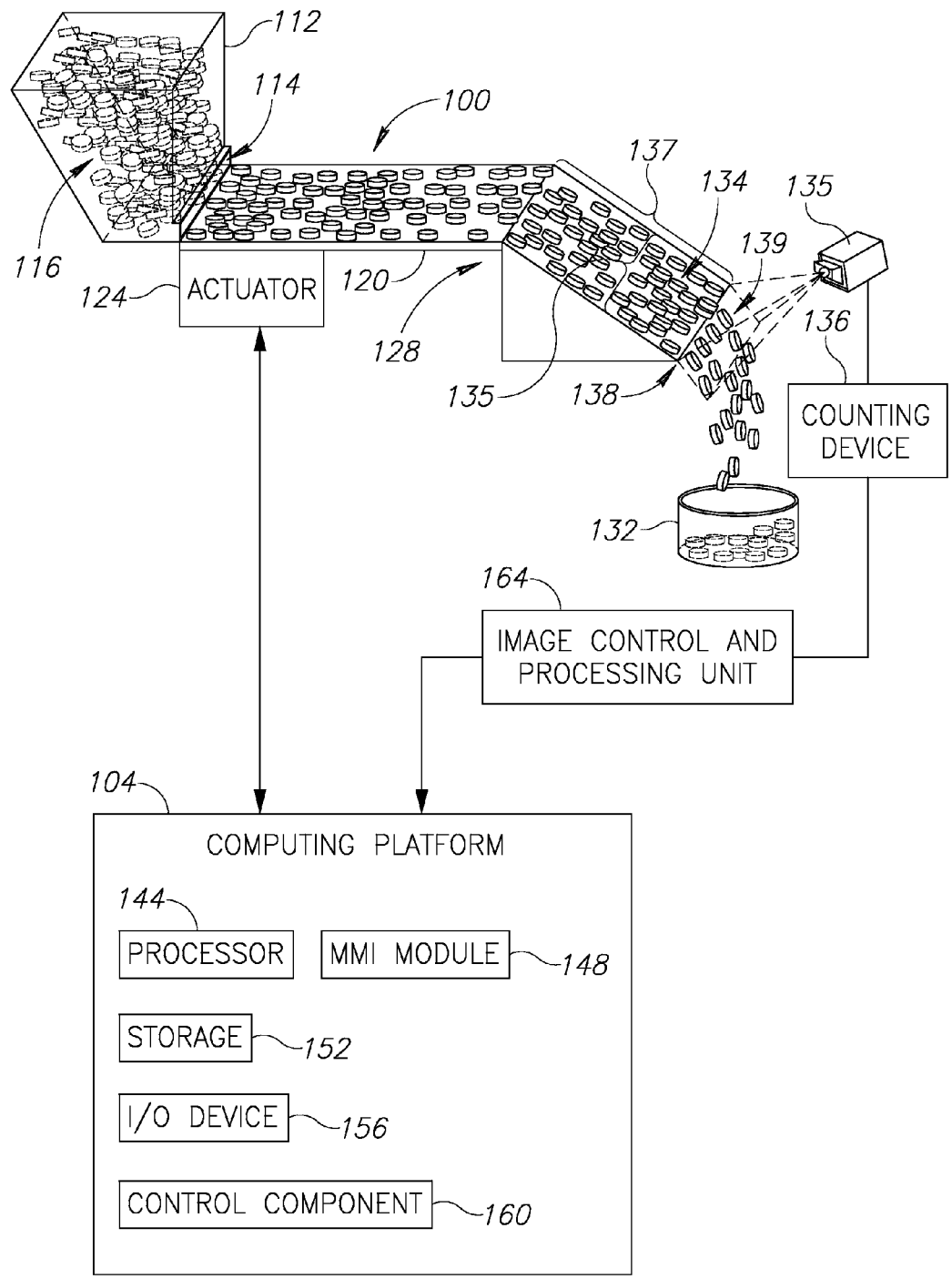
FIG. 1B shows a schematic illustration of a second exemplary embodiment of a machine for dispensing items.

Reference is now made to FIG. 1B, which shows a schematic illustration of another embodiment of an apparatus for providing for dispensing predetermined number of items at high accuracy and high efficiency.

As in FIG. 1A, the apparatus comprises machine 100, hopper or silo 112 with a gate at its lower opening 114, conveyor 120, actuator 124, computing platform 104, capture device 135, counting device 136, and container 132.

Items 116 are released onto conveyor 120, and proceed along or with conveyor 120 when operated, until the conveyor's end 128.

From conveyor end 128, the items fall onto and along slope 134. It will be appreciated that slope 134, in some embodiments, may be made of a rough material so that the items do not accelerate along slope 134, but their speed is maintained due to the friction. However, the friction coefficient between slope 134 and the items is such that the friction does not hold the items from sliding, and does not cause the items to roll, thus keeping unchanged the side of the item that touches slope 134.

Slope 134 causes the items to assume a substantially uniform speed as they fall off end 138 of slope 134, as well as continue their free fall at a similar trajectory, such that their angle in relation to capture device 135 is similar.

In some embodiments, the speed of conveyor 120 and therefore the speed of the items placed thereon, can be for example between about 2 cm per second and 20 cm per second, e.g., 6 cm per second. The speed of the items sliding along slope 134 may increase relatively to the speed of conveyor 120 and may get to between about 20 cm per second and about 2 meters per second, depending on the material of slope 134 and its angle.

At end 138 of slope 134, the items fall and reach container 132.

Capture device 135 is positioned and set so as to capture the items as they fall off end 138 of slope 134, unlike the setting of FIG. 1A at which the items are captured as they travel along a virtual "counting area" 139 extending from end 138 of slope 134 or slightly below it to a certain distance below, forming a virtual convex rectangle which faces the capture device. The images are analyzed and machine 100 is controlled and activated in substantially the same manner as in the embodiment of FIG. 1A.

Referring now to FIGS. 2A and 2B, showing a flowchart of steps in methods for calibrating and operating a dispensing machine, such as the one shown in FIG. 1, to provide high accuracy and high efficiency dispensing of items, thus yielding high throughput.

FIG. 2A shows a flowchart of steps in an embodiment of a calibrating stage 200 of a dispending machine. Calibrating stage 200 may be performed upon the manufacturing of the apparatus, so that the apparatus may be provided out of the factory with preset calibrations for various types of items and/or other parameters. Additionally or alternatively, calibrating stage 200 may be performed by the end-user before each type of a dispensing job. The user may also save these calibrations for later use.

On step 208, the conveyor is activated for a first time interval. In some embodiments, the first time interval is long enough so as to reach a substantially uniform rate of falling items, after the initial, incidental acceleration period (which typically lasts a fraction of a second) of the conveyor has been completed.

On step 212, the number of items that have fallen into the container is determined. The fallen items include also the items that have fallen due to inertial forces after the conveyor has stopped. A register may be made of the number of items that have fallen innertially. It will be appreciated that step 212 can be performed at least partially concurrently with step 208, since items may be counted as they fall, and/or after the conveyor has stopped.

On step 216, a first function is determined, which relates to the throughput of the system during continuous activation, and associates a number of items falling during and due to the operation of the conveyor with the time period for which it is required to operate the conveyor. The first function may be referred to as a continuous throughput function, and described analytically as a look-up table, as a part-wise function or in any other manner. Optionally, the first function is divided into two parts: The first part indicates a linear correlation between the conveyor's operation time and the number of items falling during that time. The second part, on the other hand, is indicative of the number of items which are expected to fall, due to inertial forces, after the conveyor had stopped. Naturally, the number of items falling innertially is not dependent on the conveyor's operation time, but rather on its operational characteristics such as speed, frequency of vibration, amplitude of vibration, inclination and/or the like. By way of example, if the conveyor is operated with a certain set of operational characteristics for a period of X seconds, the number of falling items would be $f(x)+c$, wherein $f(x)$ denotes the number of items falling during exactly the X seconds, and c denotes the number of items falling innertially, afterwards—which is a constant being independent of X.

Optionally, similar to the way c is defined in the first function, any acceleration and/or deceleration periods of the conveyor may be accounted for using another constant value, again—since these acceleration/deceleration periods are also not dependent on the length of X. Accordingly, the first part of the function may be actually divided into two sub-parts, one denoting the number of items falling (or not) during the acceleration/deceleration periods, and the other defining the number of items falling during X less the acceleration/deceleration periods—namely, during the portion of X in which the conveyor already operates with its desired operational characteristics.

On step 220, the conveyor is activated and operated for a second time interval, referred to as a pulse time interval, which is substantially shorter than the first time interval, typically lasting fractions of a second but optionally, in some embodiments, more than that. On step 224, the number of items to have fallen during and due to said operation is determined similarly to step 212 above, including the account for inertial falls and acceleration/deceleration periods. A pulse may relate to a short time interval in which the conveyor operates at its steady speed (or other characteristic) for a time period which is relatively short.

Steps 220 and 224 may be repeated one or more times, since the effect of the acceleration/deceleration periods on the number of falling items when activating the conveyor for short periods of time may be high, since the acceleration/deceleration periods are quite long in relation to the total pulse time.

On step 228, a second function is determined, which relates to the throughput of the system in pulse activations, again—accounting for the constant acceleration/deceleration periods and inertial falls. The function may be referred to as a pulse throughput function, and may associate a number of items falling during and due to the activation of the conveyor with the time period for which it is required to activate the conveyor. The function may be described analytically as a look-up table as a part-wise function or in any other manner.

In some embodiments, the first and second functions can be determined as a single, possibly part-wise, function.

The first and second functions may be determined upon multiple activations rather than a single activation each. Thus, the functions may be determined statistically while optionally employing analytical methods.

In some embodiments, the first and second functions are determined and later used when the conveyor operates under constant characteristics, excluding on the acceleration and deceleration times, such as speed, vibration frequency, vibration amplitude, or the like.

Determining the first function, comprising steps 208, 212 and 216, and determining the second function, comprising steps 220, 224 and 228, can be performed in reverse order.

It will also be appreciated that the first and second functions may be item- and setting-dependent, i.e., dispensing different items may yield different functions. In addition, other parameters of the machine may be determined, such as the conveyor speed, frequency, the height of the hopper gate, or the like.

Reference is now made to FIG. 2B, which shows a flowchart of steps in an embodiment of a dispensing stage 204 of a dispensing machine.

On step 232, the conveyor is activated for a period of time determined such that the number of items falling due to activation approaches, but doesn't reach, the number of items it is required to dispense in each container. The duration is determined in accordance with the first throughput function determined on step 216 of the calibration stage. In some embodiments, the period of time is determined such that in the majority of cases, the container will contain less than the required number of items. The reasoning for that is that it is generally desired to have fewer items, which is correctable by adding items, than having too many items dispensed.

On step 236, the number of items that have fallen into the container is determined. The number of items also includes the items that have fallen due to inertial forces after the conveyor has stopped. It will be appreciated that in some embodiments the items are counted as they fall, which happens when the conveyor is in motion and some time afterwards.

On step 240, it is determined whether items are still missing in the container to complete the entire quantity that has to be dispensed.

If no items are missing, which may be a rare occasion, then on optional step 242, the throughput functions or parameters thereof as set on calibration steps 200, such as the values of particular points in the throughput functions, are updated based on the number of items that have fallen during the initial operation and the one or more pulses. Similarly, if the number of missing items becomes, in time, lower or higher than the number earlier set in the calibration step or in previous groups dispensed, the values of particular points in the throughput functions, are updated based on the number of items that have fallen during the initial operation and the one or more pulses. The updated parameters may be employed when dispensing further groups of items or in later activations. It will be appreciated that the on-the-fly update of the calibration parameters can be performed after dispensing items into one container, after a number of containers have been dispensed, after a full dispensing task was completed, or the like. Repeatedly updating the functions or parameters enhances the accuracy and thus the throughput of the method and apparatus.

Whether the calibration parameters have been updated on the fly or not, the container is removed, and the next container is placed on step 244.

If items are still missing, two options are available, in two embodiments or in a unified embodiment: In the first option, on step 248, the required duration is determined for a pulse length, such that the items that will fall due to the pulse will approach or complete the required number of items. The duration is determined in accordance with the second throughput function determined on step 228 on the calibration stage.

In some embodiments, if the number or percentage of items missing in the container exceeds a predetermined value, for example more than 10% or 10 items of the items are missing, the pulse length may be determined such that the total number of fallen items after the pulse may still not complete the required number in many of the cases, and another pulse may be required, which may provide higher accuracy. Namely, if too many items are missing, then a single, long pulse may be inaccurate and inferior to a number of shorter pulses. If, however, the number of missing items is lower than the threshold, then the pulse length may be determined such that the total number of items after the pulse will equal the required number.

In alternative embodiments, only pulses of one or more predetermined lengths may be enabled, such that if items are missing from the container, one of the predetermined lengths can be selected. If only one such predetermined length is enabled, step 248 can be omitted.

Thus, on step 252 the conveyor may be activated for the determined or predetermined pulse length.

On step 256 the number of fallen items is determined similarly to step 236 above, and control returns to step 240.

Depending on the usage and nature of the items to be dispensed, in some embodiments, a single activation of the conveyor would be enough to ensure that in large enough percentage of the cases, the number of dispensed items is within satisfactory range from the required number. If, however, greater accuracy is required, then one or more pulses would be required to achieve the goal so that no over shooting occurs.

Figure 5:
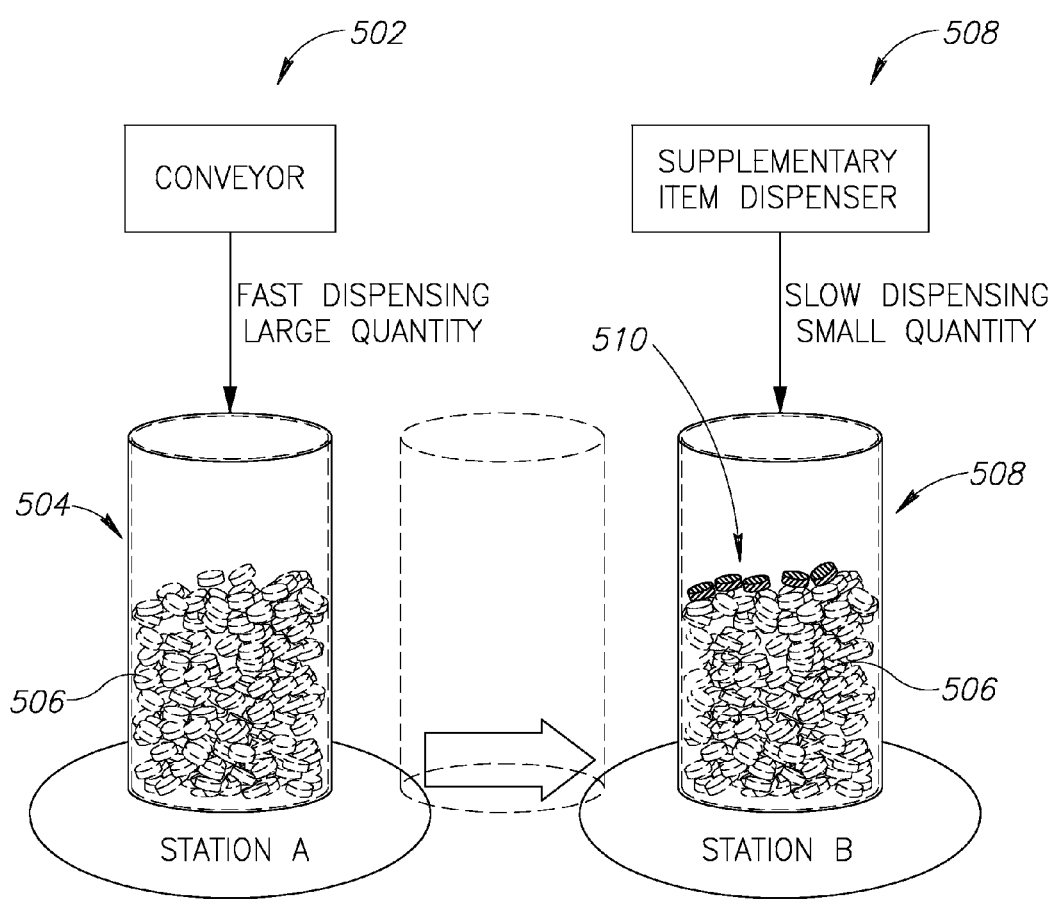
FIG. 5 shows a schematic illustration of the mode of operation of a conveyor and a supplementary item dispenser.

In the second option employed when items are still missing in step 240, a supplementary item dispenser may be utilized to dispense the missing items. Interim reference is now made to FIG. 5, which depicts this option. Firstly, a conveyor 502 is used to rapidly dispense a relatively large number of items, for example tens, hundreds or thousands of items in one operation. Conveyor 502 is stopped as the number of items 506 in a container 504 almost reaches the desired final number, such that even after the inertial fall, a few items (for example 1-10) will still be missing. Container 504 is then transported, using automatic means, from station A near the conveyor to station B near a supplementary item dispenser 508. Supplementary item dispenser 508 then dispenses the missing items 510 into container 504, typically at a much slower rate than the throughput of conveyor 502. While supplementary item dispenser 508 operates, conveyor 502 is operated again, to fill another container. This process continues until the desired amount of containers have been filled to completion.

Figure 2C:
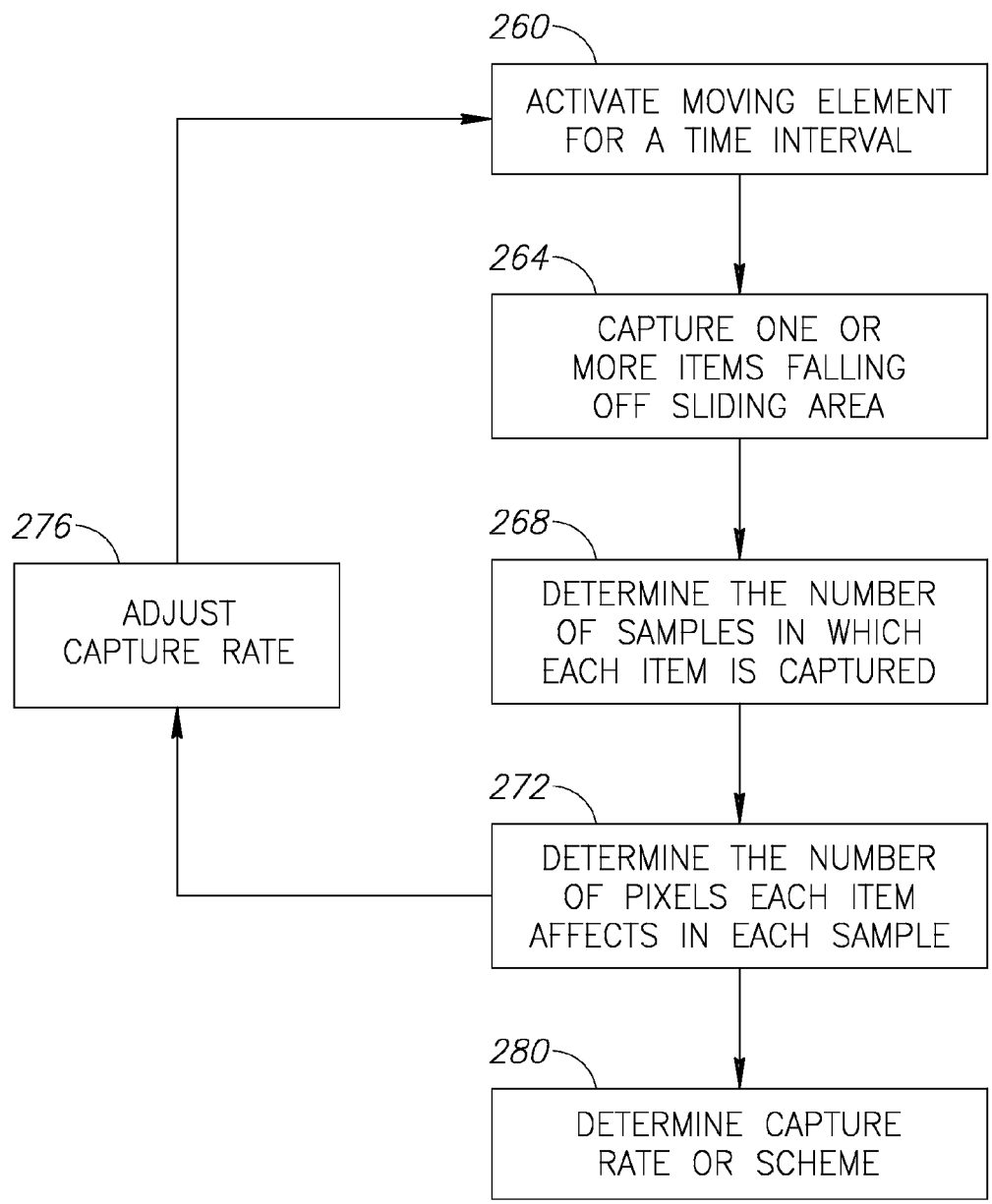
FIG. 2C is a flowchart of steps in an embodiment of a calibration stage of an imaging mechanism used for counting falling items.

Reference is now made to FIG. 2C, which shows a flowchart of steps in an embodiment of a calibration stage of an imaging mechanism used for counting falling items.

On step 260, the moving element such as the conveyor is activated for a time interval.

On step 264, one or more items are captured of items falling off the sliding area, by a multiplicity of images taken at a default or a previously set imaging rate. Each image comprises one or more pixel lines of a light sensitive sensor of the imaging mechanism.

On step 268, the number of samples in which each falling item is captured is determined, automatically or by an operator examining the samples.

On step 272, which may be performed together with step 268 or separately, the number of pixels each falling item affects in each sample is determined. For example, a cylindrical tablet having a round cross section may affect fewer pixels on the first and last sensor rows on which it is captured than the number of pixels it affects on intermediate rows.

On step 276, if required, the capturing rate is adjusted, so that the number of samples in which each falling item is captured in, and the number of pixels it affects in each sample enables the detection and distinction of all items with high accuracy.

For example, if the capturing rate is such that each item is captured in at most one sample, this may not suffice and a higher rate may be required. If, on the other hand, each captured item is captured in more than enough samples to detect and distinguish between falling items, a lower capturing rate may be used in order to lower the computational complexity. In one embodiment, a typical capturing rate may be between 25-100 frames per second. In another embodiment, the typical capturing rate may be between 101-200 frames per second. In yet a further embodiment, the typical capturing rate may be between 201-400 frames per second It will be appreciated that steps 260, 264, 268, 272 and 276 may be repeated for different times relatively to the activation pulse. For example, items that have fallen off due to inertial forces after the moving element has stopped may have different speed than elements that have fallen during steady activation of the moving element. Thus, the imaging rate of the counting device may vary in accordance with the activation state of the moving element.

On step 280, the required capture rate, or capture rate scheme if different activation phases require different capturing rates, may be determined and used for capturing items during dispensing.

It will be further appreciated that items of different shapes may require different imaging rates. For example, for imaging larger items which are viewed by each sensor line for longer periods of time may be imaged using slower capturing rate, while smaller items may require higher imaging rate.

For items having a less even shape, such as a cylinder having an elliptical cross section or any other shape, some further analysis may be performed, since the items may assume different positions and appear in varying patterns and varying number of samples, depending on their position relatively to the sensor. In such cases, the capturing rate may be set to an average or another combination of the imaging rates acceptable for different positions of the items.

Figure 3A:
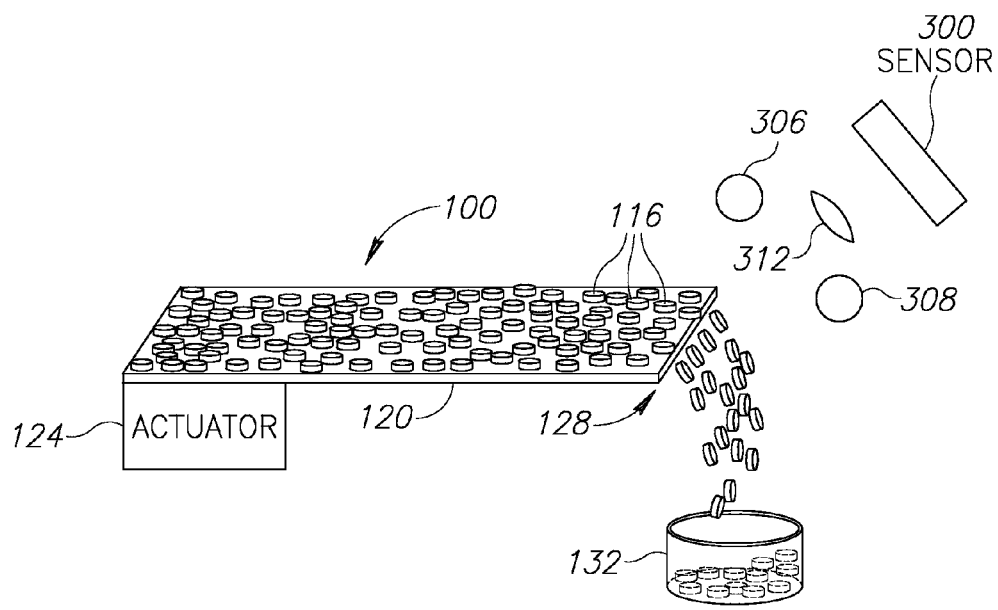
FIG. 3A is an exemplary embodiment of the lens, sensor and lightening equipment used for counting the items falling off a conveyor.

Reference is now made to FIG. 3A, showing an embodiment of a capturing device as used with the embodiment of FIG. 1A above. The capturing device captures images of items such as items 116 as they fall off end 128 of conveyor 120. The capturing device 135 comprises sensor 300, which may be a CMOS, a CCD or any other imaging sensor. The sensor may be implemented as a one- or two-dimensional collection of pixel sensors, each pixel containing a photodetector and an amplifier. If sensor 300 comprises a two-dimensional array, the rows or columns of the pixel sensors may or may not be aligned.

The sensor may be positioned such that its face is at an angle of between about 45° and about 135°, e.g. 90° to a tangent to the trajectory of the falling items, at the virtual counting area.

Sensor 300 may be located such that its central area, e.g., one or more central rows, are closest to end 128 of conveyor 120. In some exemplary embodiments, the central area of sensor 300 may be located at a distance of between about 20 cm and about 40 cm from the central area of end 128.

Capturing device 135 may further comprise one or more light sources such as light sources 306 and 308 which shed light constantly or intermittently on the falling items.

In embodiments wherein light is shed intermittently, the pulse length and frequency of the LEDs may be selected such that enough light will be reflected from each item to activate the sensor.

Light sources 306 and 308 are optionally positioned such that light will not be reflected or only minimally reflected from other objects except the items that have fallen off end 128.

Capturing device 135 may further comprise a lens 312 for focusing the light reflected from the falling items onto sensor 300. Lens 312 is optionally a lens assembly, which may, in some embodiments, provide also an optical zoom function.

The images sampled by sensor 300 may be transferred to image control and processing unit 164, which may perform the counting and report the number to computing platform 144, or transfer the raw sensor data to be processed by computing platform 144.

Figure 3B:
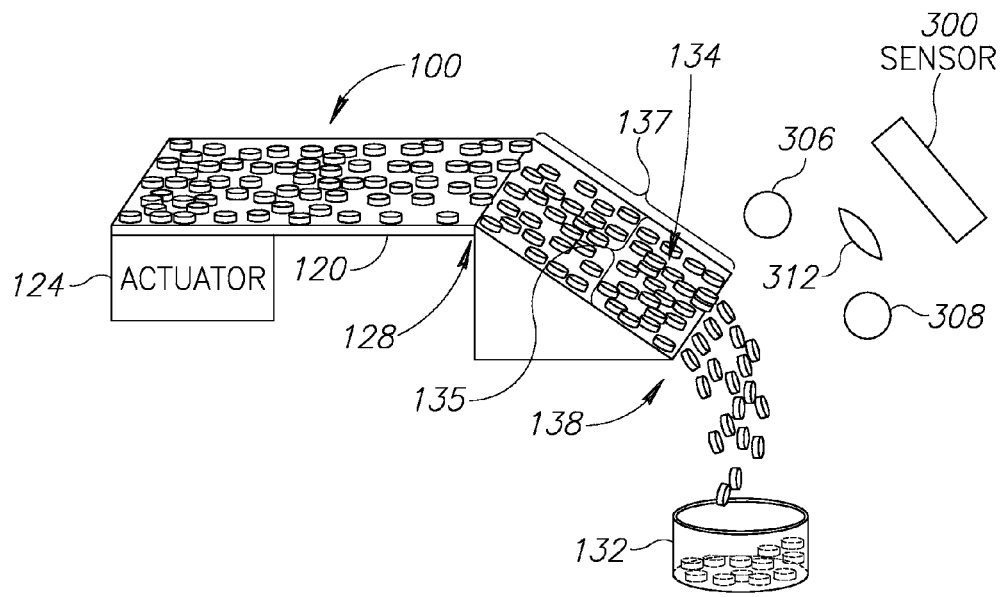
FIG. 3B is an exemplary embodiment of the lens, sensor and lightening equipment used for counting the items falling off a sliding area.

Reference is now made to FIG. 3B, showing an embodiment of capturing device 135 as used with the embodiments shown in FIG. 1B above. As in FIG. 3A above, capturing device 135 comprises a sensor 300, light sources 306 and 308, and lens 312. However, sensor 300 is positioned such that it captures images of items as they fall off end 138 of slope 134.

Sensor 300 may be located such that its central area, e.g., one or more central rows, are closest to end 138 of slope 134. In some exemplary embodiment, the central area of sensor 300 may be located at a distance of between about 20 cm and about 40 cm from the central area of end 138.

Due to inertial forces, items fall off end 138 in substantially the same posture in which they slid along slope 134. Thus, sensor 300 may be substantially parallel to a planar face of items falling off end 138 of slope 134, and substantially parallel to the continuation of the plane of slope 134.

Light sources 306 and 308 may shed light constantly or intermittently on the falling items, and may be positioned such that light will not be reflected or only minimally reflected from slope 134 but only from the items that have fallen off end 138, such as item 118.

Figure 4A:
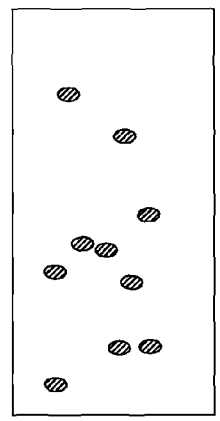
FIG. 4A shows an exemplary snapshot of items falling off the sliding area.

Referring now to FIG. 4A showing an illustration of multiple items falling off end 128 of conveyor 120 in the embodiment of FIG. 1A, or off end 138 of slope 134 in the embodiment of FIG. 1B. Since the items generally assume a stable posture on conveyor 120 and do not lean on one another, together with their speed being substantially uniform, only in rare cases tables are imaged as partially or fully overlapping. Thus, when considering consequent relatively narrow horizontal slices of FIG. 4A, each falling item can be detected. Even if two or more items are adjacent to one another, they can still be separated since as they tip over the edge thee gaps between the items increase to enable counting.

Figure 4B:
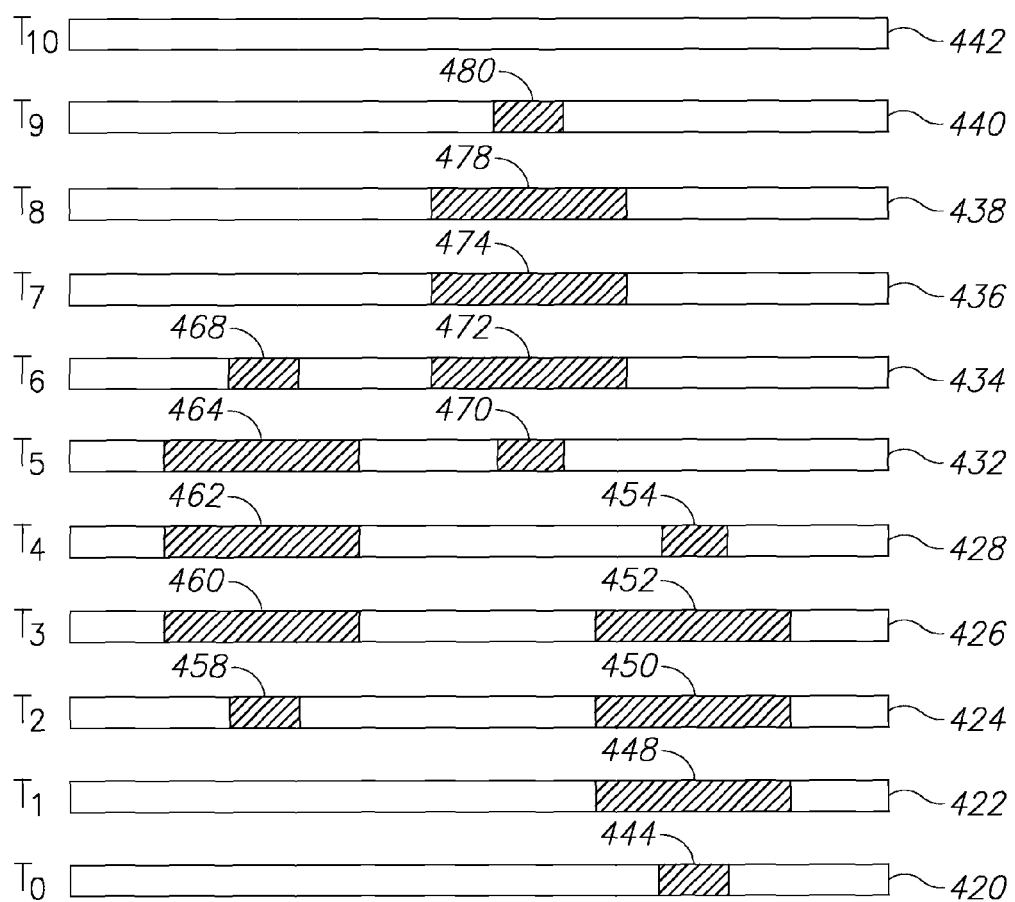
FIG. 4B is a schematic illustration of a multiplicity of sensor lines captured during the falling of three exemplary tablets.

Referring now to FIG. 4B, showing a consecutive sequence of samples of a sensor line. As mentioned, one or more lines of the sensor may be utilized. Hence, the case shown in this figure is the most general one, which shows only a single line of pixels. Sample 420, taken at time $T_0$ comprises a narrow sequence 444 of pixels affected by a lower edge of a first item consisting of sequences 444, 448, 450, 452 and 454, while samples 422, 424, 426 and 428, taken at times $T_1$, $T_2$ and $T_3$, respectively, show wider sequences 448, 450, and 452 of item 408, respectively, and sample 428 taken at time $T_4$ also shows again a narrow sequence 454 of pixels affected by item 408.

Similarly, sequences 458, 460, 462, 464 and 468 of samples 424, 426, 428, 430 and 432, respectively, taken at times $T_2$, $T_3$, $T_4$, $T_5$ and $T_6$ respectively, wherein the sequences are created by the light reflected from a second item, and sequences 470, 472, 474, 478 and 480 of samples 432, 434, 436, 438 and 440, respectively, taken at times $T_5$, $T_6$, $T_7$, $T_8$ and $T_9$ respectively, wherein the sequences are created by the light reflected from a third item.

Using the known pattern of affected pixels created by a falling item on consecutive capturing of a sensor line, the sequence of sensor line samples taken at times $T_0$ to $T_9$ are analyzed, and the three items are detected and counted. For example, distinguishing and counting the right cylindrical shapes may be based on the lower number of affected pixels at their end samples, and higher number at intermediate samples.

It will be appreciated that even if items may fall at different speeds, the general pattern may still be valid although it may slightly change. For example, if an item falls at a higher speed, its central part may appear in fewer than three samples, or its narrower first or last sample may be missing. Thus, in some embodiments, the pattern may be searched for with some flexibility.

It will also be appreciated that if two or more items seem adjacent on the sensor, the number of items may be determined by dividing the number of affected pixels by the maximal estimated number of pixels affected by a single item, and rounding the result to the higher number. Some measurements have shown that in about 1% of the cases two items may seem adjacent, while in significantly smaller percentage three or more items are adjacent, therefore such division may provide satisfactory results.

Using a single sensor, and sampling a single sensor line, or a number of sensor lines, such as 20 sensor lines, provides for cost reduction, as well as efficient detection of the falling items. The efficient detection can be used for increasing the detection speed, thus enabling the counting of more items per time unit. In other embodiments, however, two or more sensors may be used.

The analysis of the sensor lines can be performed by control and processing mechanism 164 of FIG. 1, or by computing platform 104.

In some further analysis, image analysis techniques may be used for determining whether a falling item is whole or broken, according to its various projections on the sensors. If this feature is provided, broken items can be either ignored or removed from the item stream so that the container will comprise at least the required number of proper items. Alternatively, the entire packaged unit 132 may be discarded.

EXAMPLES

The disclosure provides a method and apparatus for dispensing items into containers and counting the number of dispensed items, such that each container has a predetermined number of items. The method enables high accuracy so that exactly the required number of items is dispensed in high percentage of the cases. The method also enables for efficient counting of the items being dispensed into the container, so that relevant control commands can be provided to conveyor 120 to move or stop.

In instances where the number of items dispensed is slightly smaller than the required number of items, for example between about one item and about ten items are missing, then the rest of the items may be dispensed into the container using a different, possibly slower machine, so as not to reduce the container filling speed of the disclosed machine.

Experimental results have shown that the disclosed method can account for a counting error which is less than one item in fifty thousand (50,000), such that if, for example, each container is to contain 100 items, less than one in 500 packages will have the wrong number of items. These results, which are surprising given the high dispensing rate of the present method and apparatus, may be attributed, inter alia, to one or more parameters such as the imaging device configuration, its position and direction, the calibration stage with its two functions, the utilization of the conveyor and/or the supplementary item dispenser, as well as other parameters discussed above.

The experimental results have also provided for correct counting of up to ten cylindrical tablets falling substantially simultaneously off a conveyor having width of about 70 mm.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step or component to the teachings without departing from the essential scope thereof. Therefore, it is intended that the disclosed subject matter not be limited to the particular embodiment disclosed as the best mode contemplated for carrying out this invention, but only by the claims that follow.

In the description and claims of the application, each of the words "comprise" "include" and "have", and forms thereof, are not necessarily limited to members in a list with which the words may be associated.

What we claim is:

1. A method for rapidly and accurately dispensing a predetermined number of discrete items, the method comprising:
    operating a conveyor to transport multiple items towards an imaging device, wherein the items are arranged in a single layer and at least some of the items are transported in parallel, in a direction orthogonal to a direction of the transport;
    operating the imaging device to continuously capture images of an area immediately below an end of the conveyor, so that items falling off the conveyor are recorded in the images while in trajectory, wherein at least some of the items falling off the conveyor are falling off in parallel, in a direction orthogonal to a direction of the transport;
    processing the images in real time, to continuously determine the number of falling items;
    stopping the conveyor before the number of falling items has reached the predetermined number, while continuing to determine the number of falling items until items cease to fall off the conveyor inertially, wherein the total number of falling items is smaller than the predetermined number by up to ten; and
    operating a supplementary item dispenser to automatically and discretely dispense, one by one, the exact number of items needed to complete the predetermined number of items.

2. The method according to claim 1, wherein the operating of the supplementary item dispenser is performed at least partially simultaneously with the operating of the conveyor.

3. The method according to claim 1, wherein the area immediately below the end of the conveyor extends to an effective portion of the width of the end of the conveyor, such that all of the items transported in parallel and falling off the end of the conveyor in parallel are recorded in the images.

4. The method according to claim 1, wherein a vertical gap is provided between the end of the conveyor and an upper edge of the area, to ensure that an end surface of the conveyor is not recorded in the images.

5. The method according to claim 1, wherein the processing of the images to continuously determine the number of falling items comprises increasing an item count by one when an item exits the area, wherein an exit is determined when a top portion of an item appears in an image but is missing from a consecutive image.

6. The method according to claim 1, wherein the processing of the images to continuously determine the number of falling items comprises increasing an item count by one when an item enters the area, wherein entrance is determined when a bottom portion of an item appears in an image but is missing from an immediately preceding image.

7. The method according to claim 1, wherein the processing of the images to continuously determine the number of falling items comprises:
    tracking each item over consecutive images, from entering the area until exiting the area; and
    increasing an item count by one upon the exit of each tracked item, to prevent a miscount if occasional noise appears in one or more of the images.

8. An apparatus for rapidly and accurately dispensing a predetermined number of discrete items, the apparatus comprising:
    a parallel transport conveyor configured to transport multiple items in parallel, in a direction orthogonal to a direction of the transport, wherein the transport is from a hopper to an end of the conveyor;
    an imaging device configured to continuously capture images of an area immediately below an end of the conveyor, so that items falling off the conveyor are recorded in the images while in trajectory, wherein at least some of the items falling off the conveyor are falling off in parallel, in a direction orthogonal to a direction of the transport;
    a counting device configured to process the images in real time, to continuously determine the number of falling items;
    an actuator configured to control operation of said conveyor in accordance with actuator control commands;
    a computing platform configured to:
        receive the number of falling items from said counting device,
        generate an actuator control command of said actuator control commands, the actuator control command being to stop said conveyor before the number of falling items has reached the predetermined number, such that the number of falling items is smaller than the predetermined number by up to ten, and
        generate a dispenser control command based on the number of items needed for completing the predetermined number of items; and
    a supplementary item dispenser configured, responsive to the dispenser control command, to dispense exactly and discretely, one by one, the number of items needed for completing the predetermined number of items.

9. The apparatus according to claim 8, wherein said counting device comprises an image sensor and is configured to capture said images using a predetermined number of pixel rows of said image sensor, the predetermined number being lower than a total number of sensor rows existing in said image sensor.

10. The apparatus according to claim 8, wherein said counting device is configured to determine the number of falling items by analyzing a pattern of sensor pixels affected by a falling item in consecutive samples of the image sensor.

11. The apparatus according to claim 8, wherein said counting device comprises an image sensor, and wherein the apparatus further comprises at least one light source for providing light to be reflected by the falling items onto the image sensor.

12. The apparatus according to claim 8, further comprising a lens assembly for focusing light reflected from the falling items onto the imaging device.

13. The apparatus according to claim 8, wherein the supplementary dispenser is further configured to dispense the number of items needed for completing the predetermined number of items at least partially simultaneously with the transporting of the multiple items by the parallel transport conveyor.

14. An item dispenser comprising:
   a parallel transport conveyor configured to transport items such that items fall off an end of the conveyor at a rate of at least 50 items per second, wherein at least some of the items which fall off the end of the conveyor fall off in parallel, in a direction orthogonal to a direction of the transport;
   an imaging device configured to continuously capture images of an area below an end of the conveyor, so that items falling off the conveyor are recorded in the images while in trajectory;
   a counting device configured to process the images in real time, to continuously determine the number of falling items;
   an actuator configured to control operation of said conveyor in accordance with actuator control commands;
   a computing platform configured to:
      receive the number of falling items from said counting device,
      generate an actuator control command of said actuator control commands, the actuator control command being to stop said conveyor before the number of falling items has reached a predetermined number, such that the number of falling items is smaller than the predetermined number by up to ten, and
      generate a dispenser control command based on the number of items needed for completing the predetermined number of items; and
   a supplementary item dispenser configured, responsive to the dispenser control command, to dispense exactly the number of items needed for completing the predetermined number of items, discretely, one by one, and at a rate of 1-4 items per second.

15. The item dispenser according to claim 14, wherein the supplementary dispenser is further configured to dispense exactly the number of items needed for completing the predetermined number of items at least partially simultaneously with the transporting of the items by the parallel transport conveyor.

\* \* \* \* \*